June 13, 1950   N. ROCHESTER   2,511,599
RANGE AND DIRECTION FINDING APPARATUS
Filed March 3, 1945

BLOCK DIAGRAM OF RANGING DEVICE

IDEAL FREQUENCY CHARACTERISTIC

PRACTICAL FREQUENCY CHARACTERISTIC

DIRECTIONAL WAVEGUIDE COUPLING TO USE A
SINGLE ANTENNA FOR TRANSMITTING AND RECEIVING

INVENTOR.
NATHANIEL ROCHESTER
BY
ATTORNEY

Patented June 13, 1950

2,511,599

UNITED STATES PATENT OFFICE 2,511,599

RANGE AND DIRECTION FINDING APPARATUS

Nathaniel Rochester, South Hamilton, Mass., assignor to Sylvania Electric Products Inc., Salem, Mass., a corporation of Massachusetts Application March 3, 1945, Serial No. 580,741

4 Claims. (Cl. 343—10)

This invention relates to apparatus for and method of range and direction finding.

An object of the invention is to enable the use of such apparatus by blind persons, to guide them in their motion. The visual indicating means ordinarily used in such apparatus is, of course, useless to such persons; but my device can produce an audible signal whose frequency indicates the distance to the object whose range is to be determined, and thus a blind person can easily tell how far away the object is. The direction to the object is of course determined by the direction in which the device is oriented, and thus the blind person may point the apparatus in a given direction, and determine how far away the nearest object in that direction is.

My device is not limited to use for such purposes, but may also be used as an altimeter for airplanes, as a range and direction finder for boats, and other vehicles, and similar uses. In the latter cases, it may be desirable to transform the audible signal into a visual indication.

A feature of the invention is an oscillating circuit including a path of wave travel, or its equivalent, which determines the frequency. The invention may embody a carrier wave whose frequency is not changed, but which is modulated by a variable frequency; and the carrier may be any form of controllable wave, particularly radio and sound, or supersonic, waves. The invention is adaptable to amplitude, phase or frequency modulation, and will be understood from the following specification and accompanying drawings.

Figure 1:
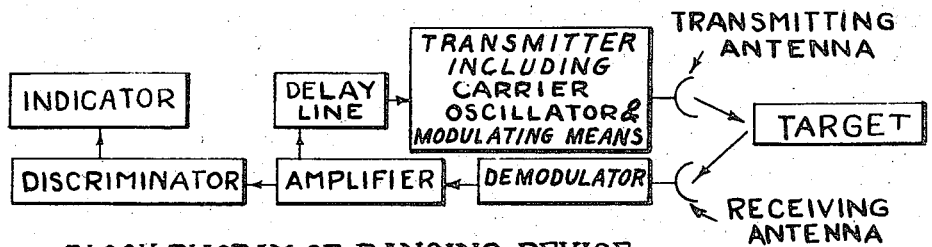
Figure 1 is a block diagram of this device embodying the invention.

In Figure 1, the carrier oscillator produces a carrier wave which is radiated in a particular direction by the transmitting antenna. When the wave is interrupted by some proper object, which we may call the target, part of it at least, will be reflected back into the receiving antenna, from which it will be passed on the demodulator, that is to produce a wave of the modulation frequency. The latter is thus amplified and coupled back to the carrier oscillator, to control the output of the latter. We thus have a circuit in which an impulse produced in the carrier oscillator is eventually fed back to the carrier oscillator to modulate it. This is a condition which should produce oscillation of itself, the oscillations it produces being a modulation of the carrier wave by a frequency that depends on the time required to feed back the impulse. Under these circumstances, neglecting all other delays, the modulation frequency emerging from the transmitting antenna at a particular phase must reach the receiving antenna in the same phase in order to reinforce the oscillation. In other words, the oscillation can only be sustained if its wavelength is equal to the distance travelled by the wave between the two antennae, or is a submultiple thereof. This distance travelled by the wave will be double the distance to the target, and the fundamental frequency will accordingly be C/2R, where C is the velocity of light and R the distance from the antennae to the target. The antennae will ordinarily be close enough together to be considered as at the same point.

The conditions for oscillation will also be fulfilled if the frequency is an even multiple of C/2R, that is, if it is KC/2R, where K is an integer.

The foregoing assumes that there is no phase reversal and no delay in the circuit except that due to the transit of the wave from transmitter to receiver. If there is no cross-coupling directly between the two antennae, such an arrangement would be satisfactory. In most cases, it is difficult to prevent such cross-coupling, and in some cases it may produce a greater signal than the signals returned from the target. To prevent this, a delay line, such as a filter network or the like, may be introduced between the amplifier and the carrier oscillator, as shown in Figure 1. Since the distance between the two antennae is small, the frequency of the modulation oscillation due to cross-coupling will then be the frequency corresponding to the delay introduced by the delay line. The cross-coupling oscillation can then be prevented by arranging the amplifier to use a band rejection filter cutting off at the frequency at which the delay line produces oscillations. Under the conditions previously discussed this would be C/D.

If, however, we use an amplifier in which the phase of the output differs by 180° from the phase of the input, because of a transformer connection or, in a direct-coupled amplifier, the use of an uneven number of tubes, the frequency will be different. The signal wave will then have to reach the receiving antenna at a period corresponding to an uneven number of half wavelengths after leaving the transmitting antenna. The frequency will then be $$\frac{C}{4E}$$

or an uneven number multiple thereof. Since an uneven number can be represented by $2n+1$, the possible frequencies will be $$f = \frac{C}{2(D+2R)}, \frac{3C}{2(D+2R)} \cdots \frac{(2n+1)C}{2(D+2R)}$$

And the frequency of the cross-coupling oscillation would be, if it occurred:

$$f = \frac{C}{2D}, \frac{3C}{2D} \cdots \frac{(2n+1)C}{2D}$$

Figure 2:
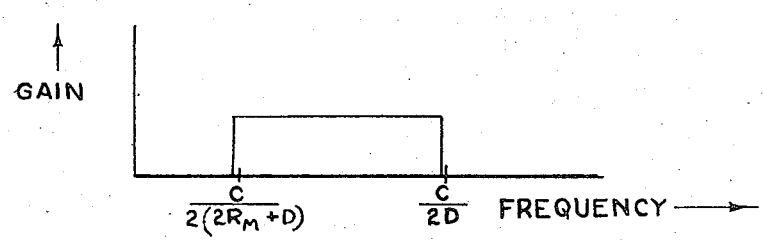
Figure 2 is a curve of the ideal frequency characteristic of the device.
Figure 3:
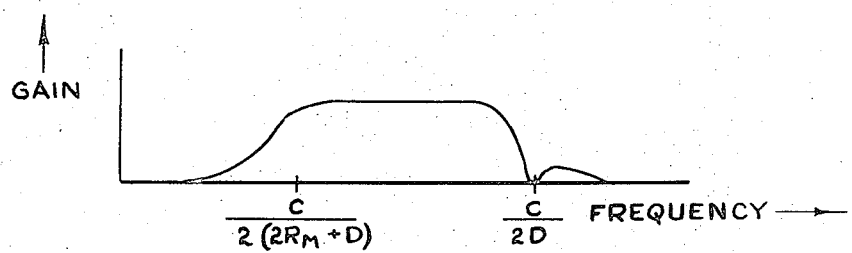
Figure 3 is a curve of the practical frequency characteristic.

The band rejection filter for this case should have its cut off at $C/2D$, as shown in Figure 2. Of course, a rectangular cut-off is impossible to achieve practically, but a cut-off such as that in the curve of Figure 3 is well-known as obtainable with equally well-known filters. The main requirement is that the filter actually rejects $C/2D$; the small transmission above this is not harmful, so long as it falls off before the next frequency $3C/2D$ is reached. The cross-coupling oscillation will thus be prevented.

There is one further requirement of the amplifier gain characteristic of Figures 1 and 2. The frequency of the modulation oscillation will go down as the distance to the target increases. The lowest frequency will thus correspond to a target at this maximum range, $Rm$, desired. This frequency will be, for the fundamental, $$f_m = \frac{C}{2(D+Rm)}$$

The amplifier, with its filter, will have to transmit this wavelength, but will not have to transmit any lower frequencies.

The second mode of oscillation for a target at maximum range will be $$f = \frac{3C}{2(D+2Rm)}$$

and, if the gain of the amplifier at this frequency is great enough, one will find it impossible to distinguish such a target from a closer target at its first mode. Of course, the signal strength will be less, and if the amplifier gain is kept low enough, such spurious results will be prevented.

The gain in the amplifier should be just enough to insure oscillation with a target at maximum range. If automatic volume control is used, its lower limit of control may be kept above the value corresponding to a signal at maximum range. In any event, the amplifier and the whole feed-back circuit has a linear response characteristic over the desired frequency range (Fig. 3) in the sense that no additional demodulator is included.

In the use of my device by the blind, the possibility of a far target appearing nearer than it really is because of reception of its second mode, may not be too important, because as the blind person gets nearer to it the spurious effect of the second mode will disappear, and in any event the first mode will always be present.

But if we desire to eliminate the second mode from a remote target we can fix the maximum range so that its second mode is at or above the cut off frequency $C/2D$. This will occur if we make the delay $D$, of the delay line, equal to the delay of the wave in travelling to a target at maximum range and back.

So far, we have seen that the modulation frequency will decrease as the distance to the target increases. Thus nearby objects produce a high frequency, far objects a low frequency. If all the frequencies produced in the desired range of distances are in the audible scale, a small part of the amplifier output could be led directly into a pair of earphones, or a device such as used for emitting sound in hearing aids, and worn by the blind person using the apparatus. If the device was to be used for other purposes, part of the amplifier output could be led into a discriminator of some well-known type, which would change the frequency variation into amplitude variation, if desired, for operating a direct reading instrument. This latter could be done whether or not the modulation was at audio frequencies.

However, in some cases, the frequencies produced by the modulation may not be in the audible scale for the range of distances desired. In this case, the frequencies would have to be reduced to affect the blind man's ears. This could be done, for example, by using the amplitude variation produced by the discriminator to vary the frequency of a local audio frequency oscillator in the manner customary in frequency modulation transmitters.

Figure 4:
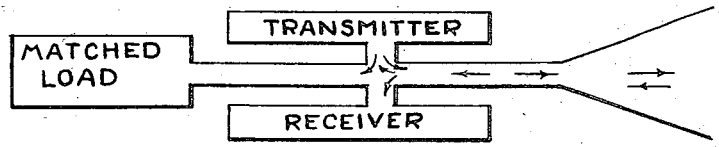
Figure 4 is a diagram of another embodiment of the invention using a single antenna.

The radiating and receiving antennae will ordinarily be of the type producing a fairly narrow beam, as a horn or reflector-enclosed type. In Figure 4, I have shown a system in which a single antennae may be used. The antenna is of the horn type, fed by a wave-guide, which also takes the received signal. The transmitter is connected to a wave guide at right angles to the main guide, and the receiver to a wave guide directly opposite. The main guide continues on into the usual matched load termination. The waves proceed as shown by the arrows.

For use by the blind, the antennae, or pair of antennae, may be made small, since the very narrow beam usually desired for direction finding is not necessary, and may be pointed like a flashlight in the direction in which the position of objects is to be determined.

For convenience, in the foregoing description, I have considered the case where the carrier wave is a radio wave, preferably a micro-wave. But supersonic waves could also be used, in which case the corresponding supersonic apparatus would be substituted. Delay lines and the like are well-known also for such waves, sometimes comprising a mecury filled tube or the like. In calculation of the modulation frequency, the velocity of the particular wave used should be considered.

What I claim is:

1. A range finder having a transmitter including a generator of a sustained carrier, a receiver responsive to said carrier and to modulation that may be present on said carrier as it is received after reflection from an object whose distance is to be measured, said receiver being close to said transmitter and having only a single demodulator yielding the modulation on said carrier, and a feed-back circuit between said demodulator and said transmitter and having a linear response characteristic, said transmitter including means energized by said feed-back circuit for modulating said carrier thereby, said carrier being modulated at a natural oscillation frequency varying as an inverse function of the distance between the range finder and the object.

2. The combination of claim 1 and indicating means energized by the output of said demodulator and responsive to the modulation frequency of the carrier wave.

3. The combination of claim 1 in which the feed-back circuit includes a delay line for suppressing very high modulation frequencies due to direct feed-back between said transmitter and said receiver and without a ranging reflection.

4. The combination of claim 1 in which said transmitter and said receiver are provided with highly directional antenna means.

NATHANIEL ROCHESTER.

REFERENCES CITED

The following references are of record in the file of this patent:

UNITED STATES PATENTS

| Number | Name | Date |
| --- | --- | --- |
| 1,945,952 | Nicolson | Feb. 6, 1934 |
| 2,134,716 | Gunn | Nov. 1, 1938 |
| 2,333,688 | Shepard, Jr. | Nov. 9, 1943 |
| 2,403,755 | Rankin | July 9, 1946 |
| 2,424,263 | Woodyard | July 22, 1947 |